United States Patent [19]

Williams

[11] Patent Number: 5,310,828
[45] Date of Patent: May 10, 1994

[54] SUPERIOR STAIN RESISTANT COMPOSITIONS

[75] Inventor: Michael S. Williams, Rome, Ga.
Thomas H. Moss, III, both of Rome, Ga.

[73] Assignee: Peach State Labs, Inc., Rome, Ga.

[21] Appl. No.: 783,580

[22] Filed: Oct. 28, 1991

Related U.S. Application Data

[63] Continuation-in-part of Ser. No. 457,348, Dec. 27, 1989, Pat. No. 5,061,763, and a continuation-in-part of Ser. No. 341,774, Apr. 20, 1989, Pat. No. 4,940,757.

[51] Int. Cl.$^5$ .................. C08G 8/30; C08G 63/48
[52] U.S. Cl. .................. 525/502; 525/401; 525/402; 525/508; 8/115.51; 8/115.6
[58] Field of Search ......... 525/502, 508, 500, 401, 525/402; 8/115.6, 115.51

[56] References Cited

U.S. PATENT DOCUMENTS

| | | | |
|---|---|---|---|
| 1,901,536 | 3/1933 | Schafer | 528/150 |
| 1,972,754 | 9/1933 | Biedermann | 528/150 |
| 1,988,985 | 1/1935 | Schafer | 528/150 |
| 2,112,361 | 3/1938 | Fischer | 528/150 |
| 2,171,806 | 9/1939 | Russell et al. | 528/150 |
| 2,205,883 | 6/1940 | Graves | 149/5 |
| 2,566,149 | 8/1951 | Strain | 260/80 |
| 2,581,390 | 1/1952 | De Groote et al. | 260/52 |
| 2,952,663 | 9/1960 | Wasserman | 525/508 |
| 3,221,079 | 11/1965 | Harris | 528/150 |
| 3,248,276 | 4/1966 | Bean et al. | 525/508 |
| 3,331,730 | 7/1967 | Bean et al. | 525/508 |
| 3,408,319 | 10/1968 | Rau | 260/23 |
| 3,481,890 | 12/1969 | Guldenpfenning | 260/20 |
| 3,843,576 | 10/1974 | Parkinson | 260/29.3 |
| 3,851,012 | 12/1974 | Wertz et al. | 260/845 |
| 3,961,881 | 6/1976 | Sumner et al. | 8/17 |
| 3,994,744 | 12/1976 | Anderle et al. | 134/4 |
| 4,081,383 | 3/1978 | Warburton | 252/8.6 |
| 4,187,383 | 2/1980 | Cowherd et al. | 560/224 |
| 4,203,859 | 5/1980 | Kirn et al. | 252/174.23 |
| 4,334,876 | 6/1982 | Beier et al. | 8/94.19 |
| 4,388,372 | 6/1983 | Champaneria et al. | 428/395 |
| 4,448,839 | 5/1984 | Morris | 428/267 |
| 4,501,591 | 2/1985 | Ucci et al. | 8/495 |
| 4,506,234 | 3/1985 | Olive et al. | 428/375 |
| 4,526,581 | 7/1985 | Prentiss et al. | 8/94.33 |
| 4,565,838 | 2/1986 | Paar et al. | 523/414 |
| 4,592,940 | 6/1986 | Blyth et al. | 428/96 |
| 4,680,212 | 7/1987 | Blyth et al. | 428/97 |

(List continued on next page.)

FOREIGN PATENT DOCUMENTS

| | | |
|---|---|---|
| 0235980 | 2/1987 | European Pat. Off. |
| 0235989 | 2/1987 | European Pat. Off. |
| 0267681 | 9/1987 | European Pat. Off. |
| 0268374 | 10/1987 | European Pat. Off. |
| 0328822 | 12/1988 | European Pat. Off. |
| 0329899 | 12/1988 | European Pat. Off. |
| 0332342 | 3/1989 | European Pat. Off. |

OTHER PUBLICATIONS

Anton, A., "Polyamide Fiber Reactive Chemical Treatments for Differential Dyeability," *Text Chem. Color* 13, 45–50 (Feb. 1981).

Bolyachevskaya, K. I., et al., "Changes in the Rates of Intermolecular Thermochemical Reactions in Polycomplexes," *Chem. Abstr.* 107:7734d (1987).

Carr, J., "Nylon and the Carpet Industry," *Textile Horizons*, 43–44 (1988).

Chatterjee, S. K., et al., "Selectivity in Interpolymer Complexation Involving Nonionic Polymers, Polycarboxylic Acid and Phenolic Polymers," *Chem. Abstr.* 106:214512z (1987).

Dehlinger, Peter J., "A Not-so-Radical Proposal for Selecting Radical Substitutions in Markush-Type Claims," *Journal of the Patent and Trademark Office Society* 74:No. 7, Jul. 1992, pp. 463–481.

Greschler, I., et al., "Stain-Resistant Polyamide Fibers with Resistance to Yellowing by Nitrogen Dioxide," *Chem. Abstr.* 108:7466p (1988).

(List continued on next page.)

*Primary Examiner*—James J. Seidleck
*Assistant Examiner*—W. R. H. Clark
*Attorney, Agent, or Firm*—Kilpatrick & Cody

[57] ABSTRACT

Novel polymeric compositions are provided for polyamide fibers or fibers having terminal amino groups that impart stain resistance and are resistant to discoloration.

14 Claims, No Drawings

U.S. PATENT DOCUMENTS

| | | | |
|---|---|---|---|
| 4,690,995 | 9/1987 | Keskey et al. | 526/286 |
| 4,699,812 | 10/1987 | Munk et al. | 427/393.4 |
| 4,739,002 | 4/1988 | Ishikawa et al. | 524/270 |
| 4,965,325 | 10/1990 | Liss et al. | 525/508 |
| 4,780,099 | 10/1988 | Greschler et al. | 8/115.6 |
| 4,822,373 | 4/1989 | Olson et al. | 8/115.6 |
| 4,839,212 | 6/1989 | Blyth et al. | 428/96 |
| 4,937,123 | 6/1990 | Chang et al. | 428/96 |
| 4,940,757 | 7/1990 | Moss, III et al. | 525/502 |
| 5,015,259 | 5/1991 | Moss, III et al. | 525/502 |
| 5,061,763 | 10/1991 | Moss, III et al. | 525/502 |
| 5,073,442 | 12/1991 | Knowlton et al. | 428/267 |

OTHER PUBLICATIONS

Hanawa, T., "Phenolic Resin Molding Compounds with Low Mold Staining," *Chem. Abstr.* 108:76525u (1988).

IG-Technical Research, Inc., "Preparation of Phenolic Resin Foams," *Chem. Abstr.* 102:204892b (1985).

Joses, D. J., et al., "Stain Resistant Carpets," Canadian Textile Journal, 105(11) 34-36 (Nov. 1988).

Knop A., et al. "Phenolic Resins", *Springer-Verlag*, 1985.

Kosicek, et al., "Dispersion Adhesive for Films Based on Plastics and Paper Impregnated by Synthetic Resins," *Chem. Abstr.* 99:196330u (1983).

Kuias, E. F., "Ablative and Flame Resistant Composition," *Chem. Abstr.* 107:79373h (1987).

Matsuo, A., et al., "Vinyl Ester Resins," *Chem. Abstr.* 104:225778a (1986).

Minnesota Mining & Manufacturing Co., et al., *World Textiles Abstracts* 5292 (1988).

Shima, T., et al., "Antistatic, Stain-Resistant Polyester Textiles," *Chem. Abstr.* 14670c (1974).

Venkataboopathy, K., et al., "Studies on Modification of Vegetable Tannins: Modified Ghat-Bor Extract as Retanning Agent," *Chem. Abstr.* 99:124391s (1983).

SUPERIOR STAIN RESISTANT COMPOSITIONS

This application is a continuation-in-part of U.S. application Ser. No. 07/457,348, now U.S. Pat. No. 5,061,763, filed on Dec. 27, 1989, entitled "Stain Resistant Treatment for Nylon Fibers" by Thomas Hudson Moss, III, Ralph Richard Sargent and Michael S. Williams, that is a continuation-in-part of U.S. application Ser. No. 07/341,774, now U.S. Pat. No. 4,940,757, filed on Apr. 20, 1989, entitled "Stain Resistant Polymeric Composition".

BACKGROUND OF THE INVENTION

This invention relates to stain resistant polymeric compositions for the treatment of natural and synthetic fibers.

Nylon has had a dramatic effect on both industry and society since its discovery by W. H. Carothers more than fifty years ago. It is estimated that 75% of all carpet currently produced in the United States, and 46% of all carpet produced in Europe, is prepared from nylon fiber.

Nylon fiber is relatively inexpensive and offers a combination of desirable qualities such as comfort, warmth, and ease of manufacture into a broad range of colors, patterns and textures. However, nylon, as well as other polyamide fibers and fabrics, is easily stained by certain natural and artificial colorants such as those found in coffee, mustard, wine, and soft drinks.

Recently, fluorochemical coatings have been developed that prevent wetting of the carpet surface, by minimizing chemical contact between the carpet surface and substances that can stain the carpet, making the substance easier to remove. Fluorochemicals also provide a physical barrier to staining material. Examples of commercially available fluorochemical coatings include Scotchgard ™ 358 and 352 (Minnesota Mining & Mfg. Co.) and Zepel ™ and Teflon ™ (E. I. Du Pont Nemours & Co.). Antron Plus ™ carpet manufactured by Du Pont contains nylon carpet fibers coated with fluorocarbons.

While fluorochemical coatings are effective in protecting carpet from substances such as soil, they offer little protection from stains resulting from acid dyes that are found in common household materials such as wine, mustard and soft drinks. Acid dyes are bases that bond to protonated amino sites in the polyamide fiber. A wide variety of methods have been developed to make polyamide fibers or other fibers with terminal amino groups more resistant to staining by acid dyes. The most widely used method involves the application to the polyamide fiber of a formaldehyde phenol or naphthol condensation polymer that has sulfonate groups on the aromatic rings. The sulfonate and hydroxyl groups ionically bond to available protonated amino groups in the polyamide fiber, preventing the protonated amino groups from later bonding to common household acid dyes. The polymeric coating also protects the carpet fiber by creating a barrier of negative electric charge at the surface of the fiber that prevents like-charged acid dyes from penetrating the fiber.

Examples of phenol-formaldehyde condensation polymers are described in U.S. Pat. No. 4,501,591 to Ucci, et al., and U.S. Pat. Nos. 4,592,940 and 4,680,212 to Blythe, et al. In particular, U.S. Pat. Nos. 4,592,940 and 4,680,212 describe a formaldehyde condensation product formed from a mixture of sulfonated dihydroxydiphenylsulfone and phenylsulphonic acid, wherein at least 40% of the repeating units contain an —SO$_3$X radical, and at least 40% of the repeating units are dihydroxydiphenylsulfone.

Sulfonated hydroxyaromatic formaldehyde condensation products marketed as stain resistant agents include Erional ™ NW (Ciba-Geigy Limited, containing a formaldehyde condensation copolymer of dihydroxydiphenylsulfone and naphthalene sulfonic acid), Intratex N ™ (Crompton & Knowles Corp.), Mesitol ™ NBS (Mobay Corporation), FX-369 (Minnesota Mining & Mfg. Co.), CB-130 (Grifftex Corp.), and Nylofixan P (Sandoz Chemical Corp., containing a formaldehyde condensation copolymer of dihydroxydiphenylsulfone and 2,4-dimethylbenzenesulfonic acid). Antron Stainmaster ™ carpet manufactured by Du Pont contains nylon fibers that have both a fluorocarbon coating and a sulfonated phenol-formaldehyde condensation polymeric coating.

While sulfonated hydroxyaromatic formaldehyde condensation polymeric coatings reduce the staining of polyamide fibers by acid dyes, they do not impart resistance to staining by compounds such as mustard with tumeric or hot coffee. Further, ultraviolet light and nitrogen dioxide can yellow the polymers over time. The yellowing can be severe enough to prevent the use of the stain resistant compositions on light shaded textile articles.

Efforts to overcome the discoloration problem are discussed in U.S. Pat. No. 4,780,099 to Greschler, et al., describing the reduction of yellowing by application of phenol formaldehyde condensation stain resistant compositions at pH values of 1.5–2.5, and in European Patent Application 87301180.3 by E. I. Du Pont Nemours & Co., describing that polyamide fabrics with improved resistance to staining as well as discoloration prepared with etherified or acylated formaldehyde phenol condensation polymers. U.S. Pat. No. 4,822,373 to Olson et al. discloses a stain resisting composition for nylon fibers prepared by blending a partially sulfonated novolak resin with a homopolymer of methacrylic acid or a copolymer of methacrylic acid with another ethylenically unsaturated monomer. U.S. Pat. No. 4,937,123 to Chang et al. discloses a stain resistant composition for nylon fibers that includes a homopolymer of methacrylic acid or a copolymer of at least 30% methacrylic acid with another ethylenically unsaturated monomer.

U.S. Pat. No. 4,940,757 and U.S. Pat. No. 5,061,763 to Moss, et al., disclose a stain resistant composition prepared by polymerizing an α-substituted acrylic acid in the presence of a sulfonated aromatic formaldehyde condensation polymer using a free radical generating agent. The resulting product imparts to polyamides improved resistance to acid dyes, while exhibiting little discoloration over time, and can be used at levels of application less than other compositions that are composed of a mere blend of polymethacrylic acid and a sulfonated aromatic formaldehyde condensation polymer.

While the above-described stain resistant compositions impart a degree of protection to polyamide fibers, many of them are colored solutions that actually alter the color of the fiber upon application. For example, when a yellow or amber solution is applied to a blue fiber, the fiber can acquire a greenish tint.

Given the tremendous volume of polyamide fiber used domestically and commercially world-wide, there is a need to provide still improved stain resistant compositions that offer a suitable combination of protection from staining by common products such as mustard, coffee, and soft drinks, that do not discolor over time, and that are economical to produce. There is also a need to provide a stain resistant composition that is sufficiently colorless that it does not alter the tint of the dyed fiber.

It is therefore an object of the present invention to provide a composition that imparts protection from staining to polyamide textile and carpet products.

It is another object of the present invention to provide a stain resistant composition that is sufficiently colorless that it does not significantly alter the tint of the fiber upon application.

It is a further object of the present invention to provide a stain resistant composition that does not yellow significantly over time.

It is still another object of the present invention to provide methods for coating natural and synthetic fibers that are effective, versatile, economical and result in products that are resistant to staining by many common household compounds, including coffee, mustard, wine and soft drinks.

It is a still further object of the present invention to provide natural and synthetic fibers coated with these stain resistant compositions that do not discolor significantly over time.

It is yet another object of the present invention to provide a method for preparing a stain resistant composition.

SUMMARY OF THE INVENTION

New polymeric compositions are provided that impart stain protection to polyamide substrates from common materials such as soft drinks including those that contain food, dye, and Color No. 40, wine, coffee, and mustard. The compositions can be produced in a wide variety of ways from inexpensive starting materials.

In one embodiment, a stain resistant composition is prepared by (1) allowing a hydroxyaromatic condensation polymer to react with a saturated or unsaturated carboxylic acid, anhydride, acid chloride, carboxylic acid precursor, or the equivalent, and then (2) allowing the product of step (1) to react alone or with acrylic acid, an α-substituted acrylic acid, or both, with a free radical producing agent, in the presence or absence of another aromatic condensation polymer.

In another embodiment, a stain resistant composition is prepared by polymerizing a fluorinated unsaturated urethane and acrylic acid, an α-substituted acrylic acid, or a combination of the two, in the presence or absence of an aromatic condensation polymer.

In still another embodiment, a stain resistant composition is prepared by (1) allowing a hydroxyaromatic compound to react with an unsaturated carboxylic acid, unsaturated carboxylic acid anhydride, unsaturated carboxylic acid chloride, other unsaturated carboxylic acid precursor, or the equivalent, saturated carboxylic acid, saturated carboxylic acid anhydride, saturated carboxylic acid chloride, other saturated carboxylic acid precursor, or the equivalent, or a saturated or unsaturated isocyanate; (2) homopolymerizing or copolymerizing the ester formed in step 1 in an aldehyde condensation reaction; (3) allowing the product of step 2 to react alone or with an acrylic acid, α-substituted acrylic acid, or combination thereof in the presence of a free radical agent.

In yet another embodiment, a stain resistant composition is prepared by heating an aromatic condensation polymer with a free radical generating agent in the presence of an aromatic sulfonic acid.

In another embodiment, a stain resistant composition is prepared by free radical polymerization of a sulfonated hydroxyaromatic acrylate with an acrylic acid or an α-substituted acrylic acid in the presence or absence of an aromatic condensation polymer.

The polymeric compositions prepared as described above can be used alone or blended with other polymeric compositions, including fluorinated soil resist compositions, to provide protection to polyamide fibers from acid dyes, such as those in soft drinks (for example, Food, Dye, and Color Number 40), mustard with tumeric, and wine, and colorants, such as those found in coffee. The compositions are resistant to discoloration over time. Importantly, most of the compositions impart little color to the fiber on initial application.

The compositions can be effectively applied to any synthetic or natural polyamide fiber or other fiber with terminal amine groups using a wide variety of means, for example, in a batch or continuous exhaust system, a treat and dry system, or in a tumbler with the polyamide material prior to extrusion. The composition can also be effectively applied as a foam, in a nonionic or anionic detergent, or along with antistatic agents, other water soluble polymers, or in combination with any other stain resistant product.

Metal salts can be added to the stain resistant composition as desired, however, many of the compositions described herein do not require metal salts for adequate performance.

DETAILED DESCRIPTION OF THE INVENTION

I. Definitions

A. As used herein, the term acrylic acid means $H_2C=CH(CO_2H)$, its salt, specifically including but not limited to the sodium, potassium, ammonium, and quaternary amine salts, or its straight, branched, or cyclic aliphatic, aromatic, or hydroxylated, ethoxylated, sulfonated or halogenated aliphatic or aromatic hydrocarbon ester.

B. As used herein, the term α-substituted acrylic acid refers to $H_2C=C(R)CO_2X$, wherein R is an aliphatic or aromatic hydrocarbon, halogenated hydrocarbon, or sulfonated hydrocarbon, phenol, naphthol, sulfonated phenol, sulfonated naphthol or a halogen, and X is H, a straight, branched, or cyclic aliphatic, aromatic, or a hydroxylated, ethoxylated, sulfonated or halogenated aliphatic or aromatic hydrocarbon, or a salt cation, specifically including but not limited to the sodium, potassium, ammonium and quaternary amine salts. Examples of R groups include hydrogen, methyl, ethyl, propyl, butyl, phenyl, phenol, sulfonated phenol, naphthol, chloro, and fluoro.

C. As used herein, the term "aromatic condensation polymer" (sometimes referred to as "novoloid" or "novolak" herein) refers to a polymer prepared by condensing an aromatic compound or compounds with an aldehyde. Any aldehyde can be used that will form an appropriate condensation polymer for the desired function, including formaldehyde, acetaldehyde, benzaldehyde, and furfuraldehyde. Examples of aromatic condensation polymers are the polymers or copolymers of 4,4'-dihydroxydiphenylsulfone (also referred to as 4,4'- sulfonylbisphenol or DDS), xylene sulfonic acid, toluene sulfonic acid, benzene sulfonic acid, cumene sulfonic acid, dodecylbenzene sulfonic acid, dodecyl diphenyloxide disulfonic acid, naphthalene sulfonic acid, benzaldehyde sulfonic acid, methylnaphthalene sulfonic acid, aminobenzene sulfonic acid, alkoxybenzenesulfonic acid, benzophenone sulfonic acid, alkylnaphthalene sulfonic acid, alkoxynaphthalene sulfonic acid, hydroxybenzenesulfonic acid, hydroxynapthalenesulfonic acid, benzene and naphthalene sulfonic acids that contain combinations of alkyl, hydroxy and alkoxy groups, as well as the salts of all of these compounds. Examples of salt cations are sodium, potassium, and ammonium. Examples of aromatic sulfonic acid salts include sodium xylene sulfonate, ammonium xylene sulfonate, sodium toluene sulfonate, sodium cumene sulfonate, ammonium cumeme sulfonate, potassium toluene sulfonate, potassium cumene sulfonate, and potassium xylene sulfonate. It will be understood by those of skill in the art that under certain conditions, certain aromatic compounds will be more reactive toward condensation in the free acid form, and that it may be preferred to form the salt after condensation. Other aromatic compounds that can be included in the aromatic condensation polymer include sulfonated derivatives of naphthol and vinyl aromatics, such as styrene and styrene derivatives.

In a preferred embodiment, at least some of the aromatic compounds in the polymer are sulfonated and/or hydroxylated. Hydroxylation increases water solubility and allows for increased hydrogen bonding of the condensation polymer with the polyamide fiber.

Aromatic condensation polymers can be prepared by methods known to those skilled in the art. Methods of preparation of condensation polymers of sulfonated aromatic compounds with formaldehyde are provided in U.S. Pat. Nos. 1,901,536 to Schafer, 1,972,754 to Biedermann, 1,988,985 to Schafer, 2,112,361 to Fischer, 2,171,806 to Russell, et al., and 4,680,212 to Blythe, et al., all incorporated herein by reference.

The aromatic condensation polymer can be reacted with a base to form a sulfonic acid salt. A number of currently marketed stain resistant polymers are sold as the partial sodium, ammonium, or mixed sulfonate salt. The condensation polymer can also be used in the form of a potassium or other salt, or as the free sulfonic acid.

Aromatic condensation polymers can be purchased commercially, such as CB-130 (Grifftex Corp.; a formaldehyde condensation product of sulfonated 4,4'-dihydroxydiphenylsulfone), Erional ™ NW (Ciba-Geigy Limited; containing a naphthalene sulfonic acid, polymer with formaldehyde and 4,4'-dihydroxydiphenylsulfone), FX-369 (Minnesota Mining & Mfg. Co.; condensation polymer of partially sulfonated 4,4'-dihydroxydiphenylsulfone), Gascofix ™ NY (Gaston County Dyeing Machine Company), Tamol ™ SN (Rohm & Haas Co.), Mesitol ™ NBS (Mobay Corporation), Nylofixan ™ P (containing a formaldehyde condensation copolymer of 4,4'-dihydroxydiphenylsulfone and 2,4-dimethylbenzenesulfonic acid, manufactured by Sandoz Corp.), and Intratex ™ N (Crompton & Knowles Corp.). The sulfonated aromatic resins are typically bought as a 30-40% solids aqueous solution, that can contain other compounds, including aromatic sulfonic acids. Erional NW and Nylofixan P are preferred commercial condensation polymers.

D. As used herein, the term "free radical producing agent" or "free radical agent" refers to a compound that generates a free radical under the disclosed conditions of use. A wide variety of free radical producing agents are known to those skilled in the art, and include but are not limited to ammonium persulfate, sodium persulfate, potassium persulfate, sodium peroxide, hydrogen peroxide, benzoyl peroxide, acetyl peroxide, lauryl peroxide, azobisisobutyronitrile, t-butyl peracetate, cumyl peroxide, t-butyl peroxide, and t-butyl hydroperoxide.

E. The term "an unsaturated or saturated carboxylic acid precursor" as used herein refers to a compound that generates an unsaturated or saturated carboxylic acid under the conditions of use or forms an ester when exposed to an alcohol under the conditions of use, other than an anhydride or acid chloride.

F. The term "unsaturated" compound as used herein refers to compound in which the functional group of interest contains, or is attached to, an $sp^2$ carbon.

G. The term "saturated" compound as used herein refers to a compound in which the functional group of interest is attached to an $sp^3$ carbon.

H. The term "ethylenically unsaturated monomer" refers to a compound that contains an alkene bond.

I. The term "unsaturated isocyanate" refers to a compound that contains an —NCO functional group attached to an $sp^2$ carbon.

J. The term "saturated isocyanate" refers to a compound that contains an —NCO functional group attached to an $sp^3$ carbon.

II. Method of Preparation of Stain Resistant Compositions

The present invention is a group of polymeric compositions that impart superior stain resistance to polyamide fibers, or to other fibers having terminal amino groups. Many of the compositions described herein do not significantly discolor the substrates when applied. Many of the compositions also do not discolor significantly over an extended period of time. The compositions provide superior protection from colorants, including acid dyes, and are effective with lower weight percentages of acrylic components than simple blends of polymethacrylic acid and aromatic formaldehyde condensation polymers.

The compositions prepared as described herein can be applied to any polyamide fiber or other fiber containing amino end groups. Polyamides are found in a wide variety of fibers and materials, such as wool, silk, natural leather, synthetic leather and nylon. Nylon is a synthetic polyamide that can be prepared in a number of ways, including by the polycondensation of a dicarboxylic acid and a diamine, such as adipic acid and hexamethylene diamine (nylon 6,6). Nylon can also be produced from a cyclic amide such as caprolactam (nylon 6).

As characterized below, the methods for making these compositions are applicable to a wide variety of starting materials and final products. For example, in Methods A-D below for the preparation of stain resistant compositions, mixtures of α-substituted acrylic acids can be used, as well as mixtures of acrylic acid with α-substituted acrylic acid. Esters of acrylic acid or α-substituted acrylic acids can be used in combination with unesterified acrylic acid or o-substituted acrylic acids. However, if the alcohol from which the ester is prepared is hydrophobic, as the percentage of ester in the composition increases, water solubility and affinity for the polyamide fiber may decrease. An ester group on the acrylic acid or α-substituted acrylic acid should be chosen that provides sufficient hydrophobicity without adversely affecting water solubility. If the alcohol from which the ester is prepared is hydrophilic or basic, water solubility may not be adversely affected. Acrylic acid derivatives with low water solubility can be polymerized using emulsion polymerization techniques known to those skilled in the art.

Further, in the methods described in detail below, an unhalogenated acrylic acid, or α-substituted acrylic acid, can be used in combination with a halogenated or acrylic acid or α-substituted acrylic acid. In one embodiment, an α-substituted acrylic acid or anhydride is included in the process that has been esterified with a halogenated alcohol. Examples of monomers are the fluorinated $C_3$ and $C_4$ esters of α-methacrylic acid. It is preferable to copolymerize a fluorinated acrylate with at least some unesterified acrylic acid or α-substituted acrylic acid to give the fiber enhanced durability. Fluorinated alkyl esters of acrylic acid have low water solubility. When polymerizing these esters, an emulsifying or suspending agent such as an ethoxylated nonyl phenol, an ethoxylated oleic acid ester, or a sorbitan monooleate can be used. Other suitable emulsifying or suspensing agents include sodium laurel sulfonate, alkyl sulfonates, alkyl arene sulfates, phosphates, alkyl polyoxyethylenes, and aryl polyoxyethylenes.

Polymerization of acrylic acid or α-substituted acrylic acid or their derivatives in the presence of aromatic aldehyde condensation polymers in Methods A–D below can be carried out under the conditions described in U.S. Pat. Nos. 4,940,757 or 5,061,763, as generally set out in Example 1, or by other methods known for the polymerization of acrylic acids.

EXAMPLE 1

Polymerization of Acrylic Acid or α-substituted Acrylic Acid in the Presence of an Aromatic Aldehyde Condensation Polymer The acrylic acid or α-substituted acrylic acid, or mixtures thereof and optionally an aromatic sulfonic acid or other viscosity adjusting agent, and the aromatic aldehyde condensation polymer are heated to between approximately 50° and 100° C., typically between 70°–80° C., with stirring for a time sufficient to effect initiation of reaction (typically 10 minutes to one hour, depending on batch size and the heat exchange capability of the vessel). The initiation of reaction is sufficiently exothermic to raise the temperature of solution to 100°–105° C. The heat of reaction is controlled by reflux. As the exotherm diminishes, the temperature of the reaction solution decreases. When the temperature falls to approximately 70° C., the solution is diluted to the desired solids level and viscosity with water or a viscosity reducing agent. Preferably, polymerization is allowed to proceed until one percent or less monomer is left in the reaction solution.

The resulting polymeric solution is acidic. If desired, the pH of the solution can be adjusted with a base such as ammonium, sodium, or potassium hydroxide.

The reaction can be performed in one batch or by dose feed. In a dose feed process, the reaction is started by adding a percentage of the starting material to the reactor, and heating to initiate reaction. After the reaction creates an exotherm, additional reactants are added. The dose feed process can be used to control the vigorous nature of the reaction. As an example, ⅓ to ½ of the starting material is added to the reactor. After the solution boils, ⅓ of the remaining material is added. The final ⅔ of the remaining material is added in two aliquots at 20 minute intervals.

It has generally been observed that the products of Methods A–E are less colored when carried out in a glass lined vessel. For this reason, metal reactors can be used but are not preferred.

Evaluations of stain resistance, initial discoloration of the fiber on application of the stain resistant composition, and yellowing of the treated fiber on exposure to light in the examples below were carried out using the American Association of Textile Chemists and Colorists (AATCC) Gray Scale for Staining, adopted in 1954, revised in 1979 and 1981, and reaffirmed in 1989. The scale rates fastness from 5 to 1, with 5 representing no essentially discoloration.

Method A

In Method A, a stain resistant composition is prepared by (1) allowing a hydroxyaromatic condensation polymer to react with an unsaturated carboxylic acid, unsaturated carboxylic acid anhydride, unsaturated carboxylic acid chloride, other unsaturated carboxylic acid precursor, or the equivalent, a saturated carboxylic acid, saturated carboxylic acid anhydride, saturated carboxylic acid chloride, other saturated carboxylic acid precursor, or the equivalent, and then (2) allowing the product of step 1 to react alone or along with an acrylic acid, α-substituted acrylic acid, an acrylate, other ethylenically unsaturated monomer, or a combination thereof, in the presence of a free radical agent. Unsaturated and saturated di- or polycarboxylic acids, acids and anhydrides are also useful in this process.

Any ratio of components is suitable that provides a product with desired characteristics. For many applications, a ratio by weight of solids of between 1 and 10 parts condensation polymer to 1 part acid, anhydride, acid chloride, or the equivalent in step (1), and a ratio of 1 part by weight of condensation polymer to between 1 and 30, preferably 1 and 5, parts by weight of an acrylic acid, α-substituted acrylic acid, an acrylate, other ethylenically unsaturated monomer, or mixture thereof, in step (2), provides a good product.

The hydroxyaromatic condensation polymer can be purchased commercially or prepared using known reaction conditions. Preferred commercially available hydroxyaromatic condensation polymers include Nylofixan P and Erional NW. The condensation polymer can be prepared by aldehyde condensation of a hydroxyaromatic compound alone or in combination with other aromatic compounds to obtain a polymer with the desired properties. A preferred hydroxyaromatic compound for condensation is sulfonated or unsulfonated dihydroxydiphenyl sulfone (DDS), that can be homopolymerized or copolymerized with a number of other aromatic compounds, including xylene sulfonic acid, naphthalene sulfonic acid, toluenesulfonic acid, cumene sulfonic acid, styrene sulfonic acid, styrene, and dodecyl benzene sulfonic acid. Aromatic compounds such as DDS can be sulfonated prior to condensation.

Unsaturated carboxylic acids, unsaturated anhydrides, unsaturated carboxylic acid chlorides, other unsaturated carboxylic acid precursors, or the equivalent, saturated carboxylic acid, saturated carboxylic acid anhydride, saturated carboxylic acid chloride, other saturated carboxylic acid precursor, or the equivalent can be used in step (1) of the reaction. Unsaturated or saturated isocyanates can also be used in this step.

Nonlimiting examples include the following carboxylic acids, as well as the corresponding anhydrides, acid chlorides and precursors of the named carboxylic acids: acrylic acid, α-substituted acrylic acid, α-methacrylic acid, maleic acid, crotonic acid, isocrotonic acid, sorbic acid, cinnamic acid, fumaric acid, oleic acid, linoleic acid, linolenic acid, acetic acid, propionic acid, butyric acid, valeric acid, caproic acid, caprylic acid, capric acid, lauric acid, myristic acid, palmitic acid, stearic acid, phenylacetic acid, benzoic acid, toluic acid, phthalic acid, hydroxybenzoic acid, acid, and formic acid.

As noted above, acrylic acid, α-substituted acrylic acid, an acrylate, other ethylenically unsaturated monomer or a combination thereof can be added to step (2). As known to those skilled in the art, certain monomers polymerize preferentially with other known monomers. For example, maleic acid (or anhydride) polymerizes more effectively with a styrene derivative than with methacrylic acid (or a methacrylic derivative). These known trends should be taken into account when choosing the components of a product composition. The ability of one monomer to copolymerize effectively with another monomer can be easily assessed, and is discussed in a number of textbooks on polymerization.

A reaction solution containing over 15% solids, and certain product compositions, may have a viscosity approaching a gel-like consistency. A viscosity reducing agent can be added to reaction mixtures in step (ii) to avoid gel formation, or to decrease the viscosity of the product for processability. Nonlimiting examples of viscosity reducing agents are the free acid or the sodium, potassium, and ammonium salts of hydroxybenzene sulfonic acid, hydroxyxylene sulfonic acid, xylene sulfonic acid, cumene sulfonic acid, toluene sulfonic acid, and dodecyldiphenyl disulfonic acid, sulfonated or unsulfonated 4,4'-dihydroxydiphenylsulfone. Many viscosity adjusting agents act as chain terminators, lowering the molecular weight of the resulting polymer. Polymers of low molecular weight tend to penetrate the shank of the polyamide fiber more easily than high molecular weight polymers.

In general, the amount of initiator needed for polymerization increases as the percent of monomer in the reaction solution increases. However, in a concentrated reaction solution, the need to use a substantial amount of initiator must be balanced against the tendency of high quantities of initiator to decrease molecular weight and viscosity. The optimal amount of initiator to be used can be determined in a given reaction without undue experimentation.

Step (1) of Method A can be carried out using any number of procedures for the esterification of an aromatic alcohol. In one embodiment, the reaction is performed with a carboxylic acid anhydride substantially in the absence of water. Step (2) can be performed as described in Example 1 or as otherwise described throughout this text.

The following examples provide representative formulations for stain resistant formulations prepared using Method A. In the examples for all of the methods, the ratios of reactants in these formulations can be modified as necessary using the skill of one in the art to attain desired characteristics of the product for a specific use. Other components can also be added as required within the scope of the present invention. These formulations are merely illustrative of the types of products that can be prepared using the method described herein, and are not intended to limit the scope of the invention. All percentages are by weight unless otherwise specified. The following abbreviations are used below: MA, methacrylic acid; SXS, sodium xylene sulfonate; AMPS, ammonium persulfate; NaOH, sodium hydroxide; MAA, methacrylic acid anhydride; and XSA, xylene sulfonic acid. Nylofixan FD-20-92CB, supplied by Sandoz, Inc. is a partially neutralized acidic material that is insoluble in water and a solid at room temperature. It can be softened by heating to approximately 40°–50° C. until the solid has taffy consistency, and is a liquid at approximately 75° C. The mass is approximately 68% solid. The material can be used as a source of Nylofixan P that has little water. The remaining water is substantially removed before reaction with the carboxylic acid, acid chloride, anhydride, or the equivalent, to prevent hydrolysis of the anhydride.

EXAMPLE 2

Preparation of Stain Resistant Compositions with Condensation Polymer Prepared from DDS and XSA and Esterified with Maleic Anhydride A condensation polymer was prepared by refluxing 30 grams of 4,4-dihydroxydiphenylsulfone, 15 grams of meta-xylene sulfonic acid, 48 grams of water, 1 gram of sulfuric acid, and 6 grams of formaldehyde at 105° C. for 2 hours. A forty three gram aliquot was taken from the product solution (47.8% solids, a tan colored paste, referred to below as 66-A). The remaining product solution was then distilled until substantially all of the water was removed and the temperature reached 120° C. At this point, 13.4 grams of maleic anhydride were added. The temperature was maintained at 145° C. for 30 minutes. The solution was cooled to 90° C., and then 27 grams of water were added to provide a red-tan paste of 57.5% solids, referred to below as 66-B. Product 66-B was gummy and soluble in water as well as in the acidic polymerization mixture.

Product 66-B was reacted separately with methacrylic acid in acid (pH 1.5) and neutral (pH 7.0, with NaOH) form, and then diluted, using the ratios of components specified in Table 1, and the procedure of Example 1.

TABLE 1

| Reaction (1) | wt(gm) | Reaction (2) | wt(gm) |
|---|---|---|---|
| Components | | Components | |
| 66-B (Acid) | 10.0 | 66-B (Neutral) | 10.0 |
| MA | 10.0 | MA | 10.0 |
| SXS | 5.0 | SXS | 5.0 |
| AMPS | 2.5 | AMPS | 2.5 |
| Water | 22.5 | Water | 22.5 |
| | 50.0 | | 50.0 |
| Dilution | | Dilution | |
| Water | 31.0 | Water | 33.0 |
| NaOH 50% | 4.0 | NaOH 50% | 2.0 |
| | 85.0 | | 85.0 |
| pH 4.1 Solids 32.7 | | pH 4.1 Solids 25.2% | |

It was observed that both polymerizations (1) and (2) were slightly hazy prior to dilution and turned cloudy upon addition of NaOH 50% to pH 4.1. Polymer (1) was orange and cloudy at pH 4.1. Polymer (2) was light yellow and cloudy at pH 4.1. On exposure to 160° F. Kool Aid for one minute, polymer (2) imparted greater stain resistance to nylon 6 carpet than polymer (1) at equal weight add on.

The unesterified aromatic condensation polymer 66-A was also allowed to react with methacrylic acid, using the ratio of components set out in Table 2, and the procedure of Example 1, and its performance evaluated as a stain treatment.

TABLE 2

| Reaction (3) | wt(gm) | Reaction (4) | wt (gm) |
|---|---|---|---|
| Components | | Components | |
| 66-A (Acid) | 10.0 | 66-A (Neutralized) | 10.0 |
| MA | 10.0 | MA | 10.0 |
| SXS | 5.0 | SXS | 5.0 |
| AMPS | 2.5 | AMPS | 2.5 |
| Water | 22.5 | Water | 22.5 |
| | 50.0 | | 50.0 |
| Dilution | | Dilution | |
| Water | 32.0 | Water | 33.0 |
| NaOH 50% | 3.0 | | 2.0 |
| | 85.0 | | 85.0 |

The polymerization products of both (3) and (4) were clear, even after dilution. Upon addition of NaOH, both became cloudy at approx. pH 2.0–2.5. On exposure to 160° F. Kool Aid for one minute, nylon 6 carpet with 4% OWG of compositions (3) and (4) provided stain resistance on nylon carpet of 3 on the AATCC scale, approximately equal to polymer (1). Polymer (2) was superior in stain resist performance to polymers (1), (3), and (4). Polymer (3) was tan and cloudy. Polymer (4) was yellow and cloudy after treatment with NaOH to a pH of 4.1.

EXAMPLE 3

Preparation of Stain Resistant Composition using Nylofixan P and Maleic Anhydride In reaction (1), 24.2 grams of Nylofixan P (FD-20-92CB) (68% solids, pH 3.0–3.5, taffy consistency) and 7.8 grams of maleic anhydride were refluxed for two hours. In reaction (2), Nylofixan P was adjusted to pH 8 and 30% solids, and then refluxed for two hours to form Product B. The product of reaction 1 was diluted with water, NaOH, and ammonium hydroxide to 30% solids and pH 2.5, to form Product A.

Products A and B were reacted with methacrylic acid using the ratios of reaction components set out in Table 3, and the procedure of Example 1.

TABLE 3

| Reaction (3) | wt(gm) | Reaction (4) | wt(gm) |
|---|---|---|---|
| Components | | Components | |
| (A) | 11.0 | (B) | 11.0 |
| SXS | 8.0 | SXS | 8.0 |
| MA | 10.0 | MA | 10.0 |
| Water | 19.0 | Water | 19.0 |
| AMPS | 3.0 | AMPS | 3.0 |
| | 51.0 | | 51.0 |

The product of reaction (3) was diluted with water and 50% NaOH to a pH of 4.5 and solids of 26.2%. The product of reaction (4) was diluted with water and NaOH to a pH of 4.5 and a solids of 30.2%. The stainperformance of compositions (A), (3), and (4) were evaluated by applying 4% OWG of each composition at pH 2.0 to superba heat set nylon 6 carpet (treated with Kool Aid at 160° F. for 1 minute followed by water rinse to remove unfixed Kool Aid). The following stain ratings were obtained: (A), 2; (3), 4.5; and (4), 4.0–4.5.

EXAMPLE 4

Preparation of Stain Resistant Composition Prepared with Nylofixan P and Methacrylic Acid Nylofixan FD-20-92CB (23.67 grams, NFP-38%, adjusted to pH 3 with $NH_4OH$) was heated at approximately 120° C. until substantially all of the water was removed. The material was allowed to cool to 100° C., at which point 5.15 gm of methacrylic anhydride was slowly added. The temperature was raised to 130° C., and maintained there for 1.5 hours. Fourier transform IR indicated the loss of anhydride absorption at 1780.52 $cm^{-1}$ and appearance of a peak at 1701. At this point, 55.5 gm of water and 3.6 gm of ammonium hydroxide were added to the solution to reach a final pH of 9.4. The product was a chalky dispersion with approximately 25% solids.

The product of reaction of the Nylofixan P and methacrylic anhydride (8.0 gm) was allowed to react under the conditions of Example 1 with 8.0 gm methacrylic acid, 3.0 gm of AMPS, 20.0 gm XSA and 61.0 gm of water. The pH of the reaction product (designated 79A below) was adjusted to 4.2 with 50% NaOH. The 79A polymer was cloudy in solution with slight settling, with approximately 30% solids.

The stain performance of 79A was tested by applying 3.2% OWG of the 30% solids solution to BASF nylon 6 superbaset carpet. The product imparted minimal initial color to the fiber. The treated carpet was exposed to double strength Kool Aid. TM at 140° F. for 1 minute, and then rinsed with cool tap water. The 79-A product exhibited slightly better stain resistance than a representative polymeric composition prepared according to U.S. Pat. No. 5,061,763.

EXAMPLE 5

Preparation of Stain Resistant Composition with Nylofixan and Methacrylic Anhydride Nylofixan FD-20-92CB (68%, 36.570 grams) and 7.660 gm of XSA were heated with agitation to distill off substantially all of the water. Distillation was continued until the temperature reached 120° C., and then the solution was cooled to 90° C. Methacrylic anhydride (8.8 grams) was added, and then the solution was heated to 135° C. for 45 minutes. After 45 minutes, the solution was cooled to 75° C. Water (45.77 grams) was then added to provide a 44% solids, clear, dark amber solution (designated 81A).

The 81A product (11.51 gm) was allowed to react under the conditions of Example 1 with 5.28 gm XSA, 9.99 gm methacrylic acid, 2.78 gm AMPS, and 44.50 gm water. After reaction, 6.94 grams of water was added along with NaOH to adjust pH to 4.4 (referred to below as 81B). The solution contained 29% solids.

EXAMPLE 6

Stain and Lightfast Performance of 81A and 81B

The stain and lightfast performance of the following formulations were evaluated on superba heat set nylon 6 white carpet:

1. Control- 400% wet pick up (WPU) of a blank dye bath containing 1 gm/L dioctylsulfosuccinate and 0.5 g/L Dowfax 2A1 (dodecydiphenyloxide disulfonate, sodium salt);
2. 2.0% OWG 81A;
3. 2.0% OWG 81A neutralized with NaOH to pH 7;

4. 2.0% OWG Nylofixan P;
5. 3.2% OWG BASF Stain Protector (38% solids);
6. 2.0% OWG BASF Stain Protector (38% solids);
7. 5.0% OWG 81B (24% solids); and
8. 3.1% OWG 81B (24% solids).

The samples were each initially microwaved for 3½ minutes with a 400% WPU of the blank dye bath, and then rinsed and extracted. They were then microwaved for 3½ minutes with a 400% wet pick up of stain treatment solution at pH 2.0, adjusted with sulfamic acid. The samples were then squeezed as dry as possible, and then dried with a hot air drier at 150° F. Each sample was then cut in half. One of each of the half samples was exposed to 20 hrs Xenon light and given an X to denote it had been exposed to light. Each numbered sample along with its corresponding X sample was then dipped in double strength Kool Aid at 140° F. for 1 minute, and then rinsed with cool tap water, and discoloration assessed according to the AATCC scale. The results are provided in Table 4 with 0 indicating maximum yellowing and maximum staining under the specified conditions.

TABLE 4

| Treatment | Initial Yellowing | Exposed Yellowing | Stain | Exposed Stain |
|---|---|---|---|---|
| 1. | 5 | 5 | 0 | 0 |
| 2. | 4 | 3-4 | 1-2 | 1-2 |
| 3. | 4 | 3 | 2-3 | 2-3 |
| 4. | 2-3 | 2 | 2 | 2 |
| 5. | 4 | 4 | 4-5 | 4 |
| 6. | 4 | 4 | 4 | 3-4 |
| 7. | 4-5 | 4-5 | 4-5 | 4-5 |
| 8. | 4-5 | 4-5 | 4 | 4 |

Samples (5) and (7) had equal solids OWG (1.2%) and samples (6) and (8) had equal solids OWG (0.76%). Notwithstanding this, samples (7) and (8) were less yellow before and after Xenon exposure, and (7) and (8) appear equal to or slightly better in stain resistance than samples (5) and (6), particularly after 20 hours of Xenon exposure. When comparing (8) to (5), sample (8) is less yellowing and virtually equal in stain resistance but has 36.6% less solids. Samples (7) and (8) also imparted the least coloration to the fiber on initial application.

EXAMPLE 7

Effect of Varying the Ratio of Components in the Stain Resistant Composition on Stain Performance Nylofixan P (235.0 gm, NFP[FD-18-92CB(Na)), and xylene sulfonic acid (65.0 gm) were mixed and the temperature raised to 100° C. with agitation. The water was substantially removed from the mixture. After approximately 135 minutes, the temperature had risen to 120° C. and 70.3 gm of distillate had been collected. At this point 60.6 grams of methacrylic anhydride were slowly added, while maintaining reflux. The temperature was maintained at 120° C. for 1 hour. Water (290.0 grams) was then added. The final weight of the solution was 560.0 gm (referred to below as product 1).

Product 1 was allowed to react with methacrylic acid using the ratios by weight of components yielding the compositions I-VI in Table 5.

TABLE 5

| Components | I | II | III | IV | V | VI |
|---|---|---|---|---|---|---|
| Product 1 | 60.0 | | 30.0 | 15.0 | 10.0 | 5.0 |
| Methacrylic Acid | | 20.0 | 10.0 | 17.0 | 18.0 | 18.4 |
| Xylene Sulfonic Acid | 1.5 | 1.5 | 6.5 | 7.0 | 6.0 | 7.0 |
| Water | 35.5 | 75.5 | 50.5 | 58.0 | 63.0 | 66.6 |
| Ammonium Persulfate | 3.0 | 3.0 | 3.0 | 3.0 | 3.0 | 3.0 |

All of the polymer products were applied to superba heat set nylon 6 carpet samples at 3.2% OWG, and evaluated for stain performance using the procedure described above in Example 5. Samples IV and V were also tested at 2.1% OWG. The results are provided in Table 6.

TABLE 6

| | 3.2% OWG | | 2.1% OWG | |
|---|---|---|---|---|
| Composition | Stain Performance | Initial Yellowing | Stain Performance | Initial Yellowing |
| I | 4-5 | 3 | | |
| II | 2 | 5 | | |
| III | 4 | 3-4 | | |
| IV | 4 | 4-5 | 4 | 4-5 |
| V | 4 | 4-5 | 3 | 4-5 |
| VI | 3-4 | 4-5 | | |

Method B

In Method B, a stain resistant composition is prepared by (1) allowing a hydroxyaromatic compound to react with an unsaturated carboxylic acid, unsaturated carboxylic acid anhydride, unsaturated carboxylic acid chloride, other unsaturated carboxylic acid precursor, or the equivalent, saturated carboxylic acid, saturated carboxylic acid anhydride, saturated carboxylic acid chloride, other saturated carboxylic acid precursor, or the equivalent, or a saturated or unsaturated isocyanate; (2) homopolymerizing or copolymerizing the ester formed in step 1 in an aldehyde condensation reaction; and (3) allowing the product of step 2 to react alone or with an acrylic acid, α-substituted acrylic acid, or combination thereof in the presence of a free radical agent.

Any ratio of components is suitable that provides the desired results. For many applications, a ratio by weight of solids of approximately 1 part by weight sulfonated hydroxyaromatic compound to between 0.5 and 2.5 parts acid, anhydride, acid chloride, or the equivalent in step (1); a ratio of approximately 1 part by weight of aldehyde to between 0.5 and 2 parts by weight of an aldehyde in step (2); and a ratio of 1 part by weight of condensation polymer to between 1 and 30 parts by weight, preferably between 1 and 5 parts by weight, of acrylic acid, α-substituted acrylic acid, or a mixture thereof, in step (3).

Nonlimiting examples of sulfonated hydroxyaromatic compounds include hydroxybenzenesulfonic acid, hydroxynapthalenesulfonic acid, and sulfonated dihydroxydiphenylsulfone, as well as unsulfonated hydroxyaromatic compounds, and the salts of these compounds, such as the sodium, potassium, and ammonium salts. The choice of hydroxyaromatic compound will be influenced by a variety of factors, including desired aqueous or organic solubility, desired degree of sulfonation, desired viscosity, color of product and ability to impart stain resistance. One of skill in the art will know how to select the appropriate hydroxyaromatic compound based on known properties of these compounds, and by testing compositions that include a desired sulfonic acid using known methods.

The step (1) reaction can be carried out under known conditions for esterification, including heating acrylic acid or α-substituted acrylic acid with the hydroxyaromatic compound in an appropriate solvent with an acid or base. Alternatively, acrylic acid anhydride or α-substituted acrylic acid anhydride can be heated with the desired alcohol neat or in an organic solvent. The reacted acrylic acid can be used as is without isolation in the polymerization reaction. A diester of acrylic acid or α-substituted acrylic acid can be formed from the reaction of a dihydroxy aromatic compound with the acrylic acids.

The aldehyde condensation reaction can be carried out under conditions known to those skilled in the art for the preparation of aromatic aldehyde condensation polymers generally. The process in step (3) can be carried out as described above in Method A.

EXAMPLE 8

Comparison of the Stain Performance of Selected Polymers Prepared under Methods A and B; Esterification before vs. after Condensation Product A was prepared as follows. Dihydroxydiphenyl sulfone (98%, 14.2 grams), XSA (90%, 60.5 grams), and $H_2SO_4$ (66%, 3.9 grams) were allowed to react at 120° C. for approximately one hour. The solution was then cooled to 85° C. and methacrylic anhydride was added (21.4 grams). The temperature was maintained at 120° C. for one hour and then cooled to 50° C.

Product AC was prepared as folows. Product A (48.0 grams) and formaldehyde (4.5 grams) were heated to 110° C. The temperature was then allowed to drop to 80° to 90° C. and held for four and a half hours. Water was then added (47.5 grams) and the solution cooled to ambient temperature to produce product AC.

Product B was prepared by heating DDS (7.6 grams), XSA (23.8 grams), $H_2SO_4$ (1.5 grams), and formaldehyde (40%, 4.6 grams) to 110° C. The temperature then was allowed to drop to 80° to 90° C. and held for four and a half hours. At that point, methacrylic anhydride (12.8 grams) was added to the reaction solution, and the temperature maintained at 120° C. for one hour. Water (49.7 grams) was then added to the solution and the solution was allowed to cool to ambient temperature.

Products (A), (AC), and (B) were allowed to react with the components specified in Table 7, using the procedure of Example 1, to form Products I-III, respectively. The weight ratio of DDS to methacrylic acid to methacrylic anhydride (from the reaction) was substantially the same in the three compositions (0.80% to 16% to 1.2%, by weight, respectively).

TABLE 7

| Components | weight (gm) |
|---|---|
| Product I | |
| (1) Product (A) | 5.6 |
| (2) XSA | 4.0 |
| (3) MA | 16.0 |
| (4) Ammonium Persulfate | 3.2 |
| (5) Water | 71.2 |
| Product II | |
| (1) Product (AC) | 12.0 |
| (2) XSA | 4.0 |
| (3) MA | 16.0 |
| (4) Ammonium Persulfate | 3.2 |
| (5) Water | 64.8 |

TABLE 7-continued

| Components | weight (gm) |
|---|---|
| Product III | |
| (1) Product (B) | 10.6 |
| (2) XSA | 4.0 |
| (3) MA | 16.0 |
| (4) Ammonium Persulfate | 3.2 |
| (5) Water | 66.2 |

Products I-III were evaluated for stain resisting performance. Each product was partially neutralized to pH 4.1 with 50% NaOH. A 0.8% solution of each product was made and pH adjusted to 2.0 with sulfamic acid. Sample carpet swatches (15.0 to 16.0 gm) were prepared by: (1) microwave steaming a 400% wet pick up solution of blank dye bath solution (see Example 5) at pH 4.0 for 2 minutes, followed by rinsing and squeezing the carpet and then (2) applying a 400% wet pick up of the product solution to the carpet sample, followed by microwave steaming for 2 minutes, and squeezing. The samples were not rinsed. Each treated sample was dried with hot air at 150° F. Half of each treated sample was then dipped in 150 ml of single strength Kool Aid for 1 minute at 160° F. and rinsed, squeezed and air dried. The samples were then evaluated for stain resistance using the AATCC scale. The results are provided in Table 8.

TABLE 8

| Product | Stain Resist | Initial Yellowing | Product Color |
|---|---|---|---|
| I | 3 | 4–5 to 5 | Lt. Yellow |
| II | 4–5 | 4–5 to 5 | Lt. Amber |
| III | 4 | 4–5 | Lt. Amber |

EXAMPLE 9

Alternative Preparation of Stain Resistant Composition using Dihydroxydiphenylsulfone and Xylene Sulfonic Acid DDS (9.1 gm) and XSA (41.2 gm) were heated to 75° C. for fifteen minutes. Methacrylic anhydride (14.2 gm) was added, raising the temperature from 80° C. to 105° C. in fifteen minutes due to an exothermic reaction. The solution was allowed to cool down for fifteen minutes to 66° C.

To this product solution (63 9 gms) was added formaldehyde (37%, 6.0 grams). An exothermic reaction raised the temperature to 78° C. The temperature was then raised to 90° C., held for 40 minutes, and then cooled to 75° C. over a period of 50 minutes. The temperature was raised to 116° C. over a 20 minute period and held at 116° C. for 15 minutes. The product became noticeably more viscous. The solution was cooled to 85° C. over 10 minutes. Water (129.9 gm) was then added, and the solution allowed to cool to 63° C. This solution (13.5 grams) was then mixed with 5.4 gm of XSA, 15.3 grams of methacrylic acid, 51.3 grams of water, and 4.5 grams of AMPS. The temperature was raised to 75° C., at which point an exothermic reaction increased the temperature of solution to 103° C. The resulting solution was clear and viscous. The product solution (90.0 grams) was mixed with water (22.8 grams) and NaOH (9.4 grams, 50%) to produce a clear solution of pH 4.4 and 30.8% solids.

EXAMPLE 10

Alternative Formulations for Stain Resistant Compositions: Evaluation of Effect of Amount of Xylene Sulfonic Acid on Clarity of Stain Resistant Formulation DDS (9.1 gm), xylene sulfonic acid (20.6 gm), and methacrylic acid anhydride (14.2 gm) were heated to 110° C. over 30 minutes. The solution was cooled to 68° C. over 10 minutes. To this solution (43.3 gm) was added formaldehyde (37%, 6.0 gm), and the temperature raised to 110° C. over 30 minutes. The solution was then cooled to 70° C. and water (60.0 gms) added. To this solution (13.5 gm, referred to below as 85II), was added methacrylic acid (15.3 gm), and varying amounts of xylene sulfonic acid, water, and AMPS, as set out in Table 9.

TABLE 9

| Components | Composition (gm) | | | | |
|---|---|---|---|---|---|
| | A | B | C | D | E |
| 85II | 13.5 | 13.5 | 13.5 | 13.5 | 13.5 |
| MA | 15.3 | 15.3 | 15.3 | 15.3 | 15.3 |
| XSA | | 2.0 | 3.5 | 4.5 | 5.4 |
| Water | 56.7 | 54.2 | 53.2 | 52.5 | 51.7 |
| Ammonium Persulfate | 4.5 | 4.5 | 4.5 | 4.5 | 4.5 |
| Water | 22.8 | 22.8 | 22.8 | 22.8 | 22.8 |
| NaOH 50% | 4.7 | 5.6 | 6.8 | 7.9 | 9.4 |
| Clarity (Haziness) | Hazy | Hazy | Less Haze | Slight Haze | Clear |

The solution temperatures were raised to 75° C., at which point an exothermic reaction increased the temperature to reflux. Reflux was maintained for approximately 15 minutes. The reactions were then cooled to 70° C., and then water and NaOH (50%) added. Formulation E was a clear, light amber solution.

EXAMPLE 11

Preparation of Stain Resistant Composition using Maleic Anhydride, DDS, and XSA

DDS (26.2 gm), XSA (52.4 gm), and maleic anhydride (21.4 gm) were mixed and heated to 125° C. Additional maleic anhydride was added portionwise over time (21.9 gm), until a significant absorbance was noted at 1755 cm$^{-1}$. At that point, the solution was cooled to 80° C. and then 13.8 gm of formaldehyde (37%) added. An exotherm raised the temperature of the solution to 130° C., where the reaction was maintained for 30 minutes, and then 136.0 gm water added to obtain product 4-3C.

Using the procedure of Example 1, 4-3C (16.0 gm) was allowed to react with 20.0 grams of SXS, 16.0 grams of methacrylic acid, 43.0 grams of water, and 5.0 grams of ammonium persulfate. Upon completion, 10.0 gm water and 9.4 gm NaOH (50%) were added to provide the final product (pH 4.27, hazy amber).

EXAMPLE 12

Preparation of Stain Resistant Composition using Acetic Anhydride, DDS, and XSA

DDS (26.2 gm), XSA (52.4 gm), and acetic anhydride (21.4 gm) were heated to 85° C., and then an additional 6.2 gm acetic anhydride was added over time with heat until the formation of ester was indicated by infared spectroscopy. The solution was then cooled to 70° C. and formaldehyde (11.0 gm, 37%) added, at which point an exotherm raised the temperature of solution to 105° C. On completion of reaction, the solution was cooled to 65° C. and 118.0 gm of water added to provide product 4-4C.

Using the procedure of Example 1, product 4-4C (15.0 gm), SXS (20.0 gm), methacrylic acid (18.5 gm), water (42.5 gm), and ammonium persulfate (5.0 grams) were allowed to react to form a clear light amber liquid, to which was added 10.0 gm water and 9.4 gm NaOH (50%), to reach a final pH 4.29 (product 4-4D).

EXAMPLE 13

Comparison of Products Prepared with Varying Ratios of Acetic Anhydride, Acetic Acid, and Formaldehyde Stain resistant compositions 7, 7B, 8, and 8B were prepared with the molar ratios of components set out in Table 10 (based on 33.5 gm of DDS), by (i) heating DDS, XSA, and either acetic acid or acetic anhydride at 85° C. until ester formation was indicated by IR, (ii) adding formaldehyde and heating the components to 110° C. for 30 minutes, (iii) cooling to 70° C. and diluting with water, and then (iv) reacting with methacrylic acid SXS using the procedure of Example 1. The products were compared (product 4-4D) for stain resistance and initial color. In Table 10, components DDS through formaldehyde are provided as molar ratios. Amounts of the remaining components are provided in grams. Each formulation was adjusted to pH 4.0 with 50% NaOH.

TABLE 10

| Components | 4-4D | NB-7 | NB-7B | NB-8 | NB-8B |
|---|---|---|---|---|---|
| DDS | 1.00 | 1.00 | 1.00 | 1.00 | 1.00 |
| XSA | 2.40 | 1.60 | 1.60 | 1.60 | 1.60 |
| Acetic Anhydride | 2.60 | 2.00 | 2.00 | — | — |
| Acetic Acid | — | — | — | 3.90 | 3.90 |
| Formaldehyde | 1.40 | 1.25 | 2.00 | 1.25 | 2.00 |
| Methacrylic Acid | 18.5 gm | 18.5 gm | 18.5 gm | 18.5 gm | |
| Novoloid | | 15.0 gm (35%) | 15.0 gm (35%) | 15.0 gm (35%) | 15.0 gm (35%) |
| SXS | 20.0 gm | 20.0 gm | 20.0 gm | 20.0 gm | 20.0 gm |
| AMPS | 5.0 gm | 5.0 gm | 5.0 gm | 5.0 gm | 5.0 gm |
| Water | 61.5 gm | 61.5 gm | 61.5 gm | 61.5 gm | 61.5 gm |
| Stain Resist | 4-5 | 4 | 4 | 5 | |
| Initial Color | 4-5 | 4-5 | 5 | 3-4 | |

NB-7B and NB-8B gelled due to the high formaldehyde to DDS ratio and NB-8B could not be adequately solubilized and therefore was not used in the methacrylic acid reaction.

EXAMPLE 14

Incorporation of Fluoromethacrylate Monomer into Product of Example 11

Methacrylic anhydride (8.46 gm), hexafluorobutanol (10.00 gm) to pH 4, and methane sulfonic acid (0.12 gm) were heated to 40° C. and maintained at that temperature for 2 hours to provide product 4-9-1. In order were mixed product 4-4C (18.0 gm), SXS (22.0 gm), methacrylic acid (8.5 gm), and AMPS (5.0 gm) to provide product 4-9-2.

In order were mixed 4-9-1 (10.0 gm), Dowfax 2A-1 (0.5 gm), nonylphenol nine mole ethoxylate (1.0 gm), and water (35.0 gm), to provide 4-9-3.

In order were mixed 4-9-2 (53.5 gm) and 4-9-3 (46.5 gm), and the temperature raised to 75° C., until an exothermic reaction raised the temperature to the boiling point. The reaction mixture was then treated as in Example 1. The resulting stain resistant composition at 3.2% owg of the composition provided a resistance of 5 on the AATCC scale.

EXAMPLE 15

Incorporation of Aliphatic Primary Alcohol into Stain Resistant Composition

Solutions A and B in Table 11 were heated separately for two hours at 40°-50° C. (MSA is methanesulfonic acid. NP-9 is nonylphenol nine mole ethoxylate). Mixtures C, D, and E were then mixed as described below, and mixtures F and G reacted as described in Example 1. At 3.2% OWG, both products F and G provided a stain resistance of 5 and an initial color of 4-5.

TABLE 11

| (A) | gms | (B) | gm |
|---|---|---|---|
| 2-Ethylhexanol | 10.00 | Butyl Alcohol | 10.00 |
| Meth. Anhyd. | 11.90 | Meth. Anhyd. | 20.80 |
| MSA | 0.15 | MSA | 0.18 |
| 4-10A-1 | 22.05 | 4-10B-1 | 30.98 |

| (C) | gms | (D) | gm | (E) | gm |
|---|---|---|---|---|---|
| 4-4C | 38.0 | 4-10A-1 | 5.9 | 4-10B-1 | 6.9 |
| SXS | 44.0 | Dow 2Al | .5 | Dow 2Al | 1.5 |
| MA | 17.0 | NP-9 | 1. | NP-9 | 2.0 |
| AMPS | 10.0 | Water | 39.1 | Water | 35.1 |
| 4-10-2 | 107.0 | 4-10A-2 | 46.5 | 4-10B-2 | 46.5 |

| (F) | gms | (G) | gms |
|---|---|---|---|
| 4-10-2 | 53.5 | 4-10-2 | 53.5 |
| 4-10A-2 | 46.5 | 4-10B-2 | 46.5 |
| 4-10A | 100.0 | 4-10B | 100.0 |

Method C

In Method C, a stain resistant composition is prepared by allowing an unsaturated aromatic or aliphatic isocyanate to react with a partially fluorinated or perfluorinated alcohol to form an unsaturated fluorinated urethane that is copolymerized with acrylic acid or an α-substituted acrylic acid in the presence or absence of an aromatic condensation polymer.

An example of an aliphatic isocyanate that is suitable for preparation of this composition is α,α-dimethyl meta-isopropenyl benzyl isocyanate (TMI).

Any ratio of components can be used that produces a product with the desired properties. For certain applications, a ratio by weight of isocyanate to acrylic acid or α-substituted acrylic acid in step (i) of between 4 parts isocyanate to 1 part acid and 1 part isocyanate to 4 parts acid, and a ratio by weight of between 1 and 30 parts of components selected from the group consisting of unsaturated urethane, acrylic acid and α-substituted acrylic acid, to 1 part aromatic condensation polymer.

A fluorinated alcohol, as the term is used here, is an alcohol in which all of the hydrogens bound to carbon atoms are replace with fluorine. A partially fluorinated alcohol, as the term is used here, is an alcohol in which at least one, but not all of the hydrogens attached to carbon atoms are replaced with fluorine. Examples of partially fluorinated alcohols that can be used in this process include 2,2,3,4,4,4-hexafluorobutanol, and tetrafluoropropanol.

The isocyanate is allowed to react with the alcohol under conditions known to those in the art, including by mixing the starting materials with a catalyst such as dibutyltin dilaurate, lead naphthenate, calcium octoate, various amines or others known to those skilled in the art. The urethane product is then allowed to react with acrylic acid or an α-substituted acrylic acid in the presence or absence of an aromatic condensation polymer as described above in Example 1.

EXAMPLE 16

Preparation of Stain Resistant Composition with α,α-dimethylmetaisopropenyl benzyl(hexafluorobutyl)urethane 2,2,3,4,4,4-Hexafluorobutanol (30.0 grams), 20.0 gm of α,α-dimethyl meta-isopropenyl benzyl isocyanate, and dibutyltin dilaurate (catalyst, 10.0 grams) were stirred for three hours without exogenous heat. The reaction solution temperature and viscosity of solution increased over time as the reaction progressed. A chilled water bath was used to maintain the temperature below 45° C. To this solution (18.0 grams) was added 25.0 grams of Nylofixan P, 25.0 grams of sodium xylene sulfonate, 4.0 grams of XSA, 4.0 grams of water, 4 grams of AMPS, and 20.0 grams of methacrylic acid. The solution was allowed to react as described in Example 1, and then diluted with 30.0 grams of sodium xylene sulfonate.

A 1.5% product solution was applied to a nylon 6 carpet sample at 300% WPU to give 4.5% OWG at pH 2.0 (adjusted with sulfamic acid), and then the carpet sample was steamed, rinsed and dried. The sample was then treated with cherry Kool Aid TM at 160° F. for one minute, and then stain resistance evaluated using the AATCC scale. The sample exhibited a stain resistance of 4-5, indicating little discoloration.

Individual tufts float on the Kool Aid solution for at least 30 minutes, indicating water repellency.

EXAMPLE 17

Alternative Dose Feed Preparation of Stain Resistant Composition with α,α-dimethyl metaisopropenyl benzyl(hexafluorobutyl)urethane 2,2,3,4,4,4-Hexafluorobutanol (48.8 grams), 40.8 gm of α,α-dimethyl meta-isopropenyl benzyl isocyanate, and dibutyltin dilaurate (10.4 grams) were stirred for three hours without exogenous heat. The reaction solution temperature and viscosity of solution increased over time as the reaction progressed (starting material A).

Mixture B was prepared by combining Nylofixan P (26.8 gm), sodium xylene sulfonate (26.8 gm), xylene sulfonic acid (4.5 gm), methacrylic acid (25.0 gm), ammonium persulfate (6.1 gm), and water (10.8 gm).

Starting material A (18.0 grams) and mixture B (18.0 grams) were heated to 75° C. until an exothermic reaction occurred, at which point the reaction temperature was controlled by reflux. An additional 28.0 grams of product B were dose added to the reaction solution, maintaining the temperature between 75° C. and 85° C. When the last dose was added, 40.0 additional grams of product B were added and the solution allowed to reflux until it the exotherm diminished, and the temperature decreased to approximately 70° C. The product solution was diluted with 30.0 grams of sodium xylene sulfonate to provide a cloudy brown liquid with 57.2% solids.

The product was evaluated for stain performance by applying 2% and 4% OWG to superba heat set nylon 6 fiber, and treating the samples with 160° F. Kool Aid for one minute, as described in detail in Example 5. Both applications provided excellent stain resistance (4-5 on the AATCC gray scale).

The product of Example 17 has improved emulsion stability over the product of Example 16, however, the product of Example 16 has better water repellency than the product of Example 17.

Method D

In Method D, a stain resistant composition is prepared by (1) esterification of an acrylic acid or α-substituted acrylic acid with a sulfonated or unsulfonated hydroxyaromatic compound using known conditions or as set out in Method B, followed by (2) polymerization of the acrylic acid ester with a free radical initiator (or copolymerization of the acrylic acid ester with other ethylenically unsaturated monomer, including acrylic acid and α-substituted acrylic acid), in the presence or absence of an aromatic condensation polymer, as described in U.S. Pat. Nos. 4,940,757 or 5,061,763, or as generally set out in Example 1, or under known conditions for the polymerization of acrylic acids. The aromatic acrylate can be crosslinked in a formaldehyde condensation reaction.

Nonlimiting examples of sulfonated hydroxyaromatic compounds include hydroxybenzenesulfonic acid, hydroxynapthalenesulfonic acid, sulfonated dihydroxydiphenylsulfone, as well as the salts of these compounds, including the sodium, potassium, and ammonium salt. The choice of sulfonated hydroxyaromatic compound will be influenced by a variety of factors, including desired aqueous or organic solubility, desired degree of sulfonation, desired viscosity, color of product and ability to impart stain resistance when incorporated into a polymeric composition. One of skill in the art will know how to select the appropriate hydroxyaromatic sulfonic acid based on known properties of these compounds.

Esterification can be carried out under known conditions, including by heating acrylic acid or α-substituted acrylic acid with the hydroxyaromatic sulfonic acid in an appropriate solvent with an acid, base, or catalyst. Alternatively, acrylic acid anhydride or chloride, or α-substituted acrylic acid anhydride or chloride are allowed to react with the desired alcohol neat or in an organic solvent. The esterified acrylic acid can be used as is without isolation in the polymerization reaction. A diester of acrylic acid, α-substituted acrylic acid, or a mixed diester, can be formed from the reaction of a dihydroxy aromatic compound with the acrylic acids.

EXAMPLE 18

Preparation of the 4,4'-Dihydroxydiphenylsulfone Ester of α-Methacrylic Acid

Excess α-methacrylic acid anhydride and dihydroxydiphenyl sulfone were heated without solvent at approximately 100° C. for 4 to 5 hours. The reaction was followed by thin layer chromatography. When the reaction was complete, the product was used as is in a free radical polymerization reaction.

The sulfonated hydroxyaromatic acrylate is polymerized or copolymerized in the presence or absence of an aromatic condensation polymer as described in Example 1. The reaction can be performed in bulk or by dose feed. The product can be used as is or diluted with a viscosity adjusting agent, for example xylene sulfonic acid or cumene sulfonic acid or their salts.

The product of reaction of the sulfonated hydroxyaromatic acrylate with a free radical agent, optionally also in the presence other acrylic acid or α-substituted acrylic acids, can be crosslinked with an aldehyde, under conditions known to those in the art or as described above.

Polymeric compositions can be prepared using this method that have a variety of properties. In one embodiment, polymers can be prepared that are non-brittle and film forming with little water solubility when dried.

Method E

In another embodiment, a stain resistant composition is prepared by treating an aromatic aldehyde condensation polymer with a free radical generating agent in the presence or absence of an aromatic sulfonic acid, or its salt. Sufficient heat is applied to initiate reaction, and then the reaction is allowed to continue until the desired product is obtained. One of skill in the art can modify the conditions as appropriate to obtain the desired results. Any ratio of condensation polymer to free radical generating agent to aromatic sulfonic acid can be used that provides a suitable product. Examples of suitable ratios of components are provided in Table 12.

EXAMPLE 19

Preparation of Stain Resistant Composition by Treating Condensation Polymer with a Free Radical Generating Agent In the Presence of an Aromatic Sulfonic Acid or its Salt Each novoloid (aromatic aldehyde condensation polymer) was heated to the boil with the indicated amount of xylene sulfonic acid (Table 12), ammonium persulfate, and water for five minutes, and then cooled.

The stain performance of each reacted product was tested by applying 1% owg of novoloid solids to carpet samples by (i) applying a blank dye bath solution at 300% wet pick up to the carpet sample and microwaving for two minutes; (ii) rinsing and squeezing the sample; and then (iii) applying a 55.0 g/L solution of the reacted products adjusted to a pH of 2.0 with sulfamic acid at a 150% wet pick up, and then microwaving for one minute; and then (iv) drying the sample without squeezing. The control materials (condensation products that had not been treated with a free racial generating agent and an aromatic sulfonic acid) were applied to carpet samples using the same procedure except that 1% owg of novoloid solids was applied using a 150% pick-up.

Each sample was dipped in single strength Kool-Aid for one minute at 160° F. and rinsed in warm water, and then evaluated on the AATCC scale. The results are provided in Table 13. As indicated, the treated aromatic aldehyde condensation polymer provided equal or better stain performance than the untreated aromatic aldehyde condensation polymer.

TABLE 12

| Novoloid | % Solids | % Novoloid Solution Used | % XSA | % Water | % AMPS |
|---|---|---|---|---|---|
| Erional/NW | 40.0 | 30.0 | 10.0 | 55.0 | 5.0 |
| CB-130 | 35.0 | 34.0 | 10.0 | 51.0 | 5.0 |
| Nylofixan P | 30.0 | 40.0 | 10.0 | 45.0 | 5.0 |
| FX-369 | 38.0 | 32.0 | 10.0 | 53.0 | 5.0 |
| 4-4C | 34.0 | 35.0 | 10.0 | 50.0 | 5.0 |

TABLE 13

| Novoloid | Initial Color | Kool Aid Stain | Reacted Novoloid | Initial Color | Kool Aid Stain |
|---|---|---|---|---|---|
| Erional/NW | 3-4 | 1-2 | 4-11A | 1-2 | 3 |

TABLE 13-continued

| Novoloid | Initial Color | Kool Aid Stain | Reacted Novoloid | Initial Color | Kool Aid Stain |
| --- | --- | --- | --- | --- | --- |
| CB-130 | 3 | 2-3 | 4-11B | 2-3 | 3 |
| Nylofixan P | 2-3 | 2 | 4-11C | 2 | 5 |
| FX-369 | 5 | 5 | 4-11D | 3 | 5 |
| 4-4C | 5 | 1-2 | 4-11E | 3 | 1-2 |

III. Blends of Stain Resistant Polymeric Compositions with Other Additives

Any of the stain resistant polymeric compositions described above can be blended with water or soil repelling additives, or with other stain resistant compositions, to achieve desired effectiveness. The blending additive should be anionic in charge and have an affinity for the nylon. It should also be compatible with the stain resisting polymeric composition. Polymeric coatings can be used that provide a protective film for the ionic bond formed between the protonated terminal amine groups on the polyamide and the sulfonate groups on the polymeric resin. It is believed that this protective film strengthens, and prevents materials from disrupting, the polyamide/stain resistant composition salt complex.

Halogenated polymers are especially suitable as blending materials because they are superior soil and water repellers. Examples are perfluorinated urethanes and acrylates. Examples are polymers prepared from the 2,2,3,4,4,4-hexafluorobutyl and 2,2,3,3-tetrafluoropropyl esters of acrylic acid. These polymers can be mixed with halogenated compounds such as fluorinated alkyl esters, phosphates, ethers, and alcohols, to achieve desired performance.

Two commercially available fluorochemicals that can be blended with the stain resistant composition are Zonyl TM 5180 Fluorochemical dispersion, and Teflon Tuft Coat Anionic, both manufactured by E. I. Du Pont de Nemours and Company, Inc. Zonyl TM 5180 is an aqueous fluorochemical dispersion containing a 1-10% polyfunctional perfluoroalkyl ester mixture, 10-20% polymethylmethacrylate, and 70-75% water. Teflon Tuftcoat Anionic contains 5-10% perfluoroalkyl substituted urethanes, 1-5% polyfunctional perfluoroalkyl esters, and 85-90% water.

The pH of the blending polymer is an important consideration when mixing the water and soil repelling polymeric composition with the stain resisting polymeric composition. Careful manipulation of the pH is required to prevent precipitation of the fluorochemical. Both Zonyl TM 5180 and Teflon Tuft-Coat are anionic mixtures. The stain resistant compositions prepared herein are acidic. Gradual acidification of the mixture occurs when the stain resistant polymer is added to the perfluorinated compound solution. Precipitates may form if there is a rapid reduction in pH.

The commonly used viscosity reducing agent, sodium xylene sulfonate, is not compatible with Teflon Tough-Coat or Zonyl 5180. It appears that sodium xylene sulfonate increases the water solubility of certain fluorochemicals, that causes a disruption of the emulsion surfactant system. Ethoxylated nonylphenol can be substituted for sodium xylene sulfonate.

An example of a suitable blend of polymeric compositions to be used as a stain resistant treatment for polyamides is 65% of a stain resistant composition as prepared herein, 15% water, and 20% Zonyl TM 5180. Between 0.01 and 10% OWG ("OWG" referring to on the weight of the goods), preferably greater than 1% OWG, of the solution is applied to the polyamide fiber.

XV. Method of Application of Stain Resistant Composition

The stain resistant compositions of the present invention can be applied to dyed or undyed polyamide fibers or fibers containing terminal amino groups, including synthetic and natural materials such as nylon, wool, silk, and leather. The composition can be applied to a polyamide alone or in combination with a soil and water resistant fluorochemical. The fluorochemical can be applied to the fiber either before or after treatment with the stain resistant composition.

The stain resistant compositions can be applied to fibers and textile articles by any of the methods known to those skilled in the art for application of textile treating solutions. In one embodiment, the stain resistant composition is applied to a nylon fiber in an aqueous exhaust bath, for example in a beck dye bath or in a continuous exhaust system. In another method, polyamide is mixed with the polymeric solids in a tumble vat, and then extruded. In another method for application to leather, the composition is applied in a tanning wheel, according to procedures known to those skilled in the art.

Any amount of stain resist composition can be applied to the polyamide that provides the desired performance. Application of 0.30 to 10% of polymeric composition based on the weight of the polyamide substrate to be treated typically provides effective stain resistance. The amount of composition to be applied will vary based on many factors known to those skilled in the art, including dyeability of the fiber, crystallinity of the polyamide, and the type of substrate. In general, nylon 6 fiber requires more stain resist composition than nylon 6,6 fiber to achieve the same performance level. Further, fibers that have been heat set under moist conditions usually require more stain resist composition than fibers heat set under dry conditions. The amount of stain resist composition to be used is also determined in part by the cost effectiveness of the composition.

In one embodiment, the stain resistant polymeric composition is added to a bath before, during, or after dyeing of polyamide material. The pH is then adjusted to between 0.05 and 4.0, preferably 2.0-2.5, with an acid such as sulfamic, acetic, sulfuric, hydrochloric, formic, or citric acid. The material is allowed to remain in the bath for a time and at a temperature sufficient to exhaust, or deposit, substantially all of the composition onto the polyamide article. The lower the temperature or the higher the pH, the more time is required for exhaustion. The final pH should not exceed 5.5. For example, at a pH of 2.0, a typical exhaustion at 20:1 liquor ratio of treatment solution to polyamide substrate will take approximately 15 minutes at 160° F. The polyamide material is then cold rinsed and dried.

In another embodiment, an aqueous solution that includes the stain resistant composition, adjusted to acidic pH, preferably 2.0-2.5, with a suitable acid, is applied to the polyamide via a flood, spray, foam, pad, kiss, or print procedure. Heat improves the efficiency of application by swelling the fiber, allowing the larger molecular size polymeric material to penetrate the substrate surface. It is preferable to apply the solution at a preheated temperature of between 110° F. and 190° F. If a fluorochemical is used, the preheating temperature should not exceed 120° F. The application can be made before, during, or after dyeing of the polyamide material.

The polyamide material can be steam treated after application of the pre-heated or cold material for a time sufficient to "fix" the stain resistant composition onto the polyamide material. For example, a 300% wet pick-up of a 1% solids solution at pH 2.0 can be fixed by steaming the polyamide material for 1-2 minutes.

The stain resistant composition can also be applied as a foam by mixing a suitable amount of a foam generating surfactant, such as ammonium laurel sulfate, with a solution of the stain resistant composition, for example, between 1:1 and 1:10 parts by weight of stain resistant composition in water. The foam is applied to the polyamide and then heat cured with steam or thermal set equipment. Alternatively, the material can be air dried.

The performance of the stain resistant formulations described herein can be enhanced by heat treatment, which in general improves the adhesion of the composition to the fiber. Sussen heat treatment after application of the composition is preferred.

If desired, a small amount of a divalent metal salt (less than 0.05% OWG), such as a salt of magnesium, can be applied along with the stain resistant composition. However, most of the stain resistant compositions described herein do not require metal salts for adequate performance.

In variations of the method for applying the stain resistant composition to fibers containing polyamide linkages, the stain resistant composition is applied in a detergent solution containing nonionic or anionic surfactants, or along with anionic antistatic agents or other water soluble polymers.

The composition can also be used as a flexible polymeric novolac type surface coating, construction insulation material, or electrical insulation product. It can also be used as a base in glue, paints, and molding resins using procedures similar to those known to those skilled in the art for incorporating other novolac type polymers.

Modifications and variation of the present invention, a method and compositions for increasing stain resistance of fibers having polyamide linkages, will be obvious to those skilled in the art from the foregoing detailed description. Such modifications and variations are intended to come within the scope of the appended claims.

We claim:

1. An aromatic polymeric stain resistant composition wherein at least some of the aromatic moieties in the polymer are sulfonated and at least some of the aromatic moieties in the polymer contain free hydroxyl groups, prepared by:
   (i) allowing a hydroxyaromatic compound to react with a compound selected from the group consisting of an unsaturated carboxylic acid, unsaturated carboxylic acid anhydride, unsaturated carboxylic acid chloride, unsaturated carboxylic acid precursor, saturated carboxylic acid, saturated carboxylic acid anhydride, saturated carboxylic acid chloride, saturated carboxylic acid precursor, saturated isocyanate and an unsaturated isocyanate;
   (ii) homopolymerizing or copolymerizing the ester formed in step (i) with an aldehyde in an aldehyde condensation reaction to form an aromatic condensation polymer; and then (iii) allowing the product of step (ii) to react with an acrylic acid, or α-substituted acrylic acid, or a mixture thereof in the presence of a free radical agent.

2. The stain resistant composition of claim 1, wherein a ratio by weight of solids of approximately 1 part by weight sulfated hydroxyaromatic compound to between 0.5 and 2.5 parts acid, anhydride, or acid chloride is used in step (i).

3. The stain resistant composition of claim 1, wherein a ratio of approximately 1 part by weight of hydroxyaromatic compound to between 0.5 and 2 parts by weight of an aldehyde is used in step (ii).

4. The stain resistant composition of claim 1, wherein a ratio of 1 part by weight of condensation polymer to between 1 and 30 parts by weight of acrylic acid, α-substituted acrylic acid, or a mixture thereof, is used in step (iii).

5. The stain resistant composition of claim 1, wherein a ratio of 1 part of condensation polymer to between 1 and 5 parts by weight of acrylic acid, α-substituted acrylic acid, or a mixture thereof, is used in step (iii).

6. The stain resistant composition of claim 1, wherein the hydroxyaromatic is dihydroxydiphenyl sulfone.

7. The stain resistant composition of claim 1, wherein the hydroxyaromatic is allowed to react with acetic anhydride.

8. The stain resistant composition of claim 1, wherein the α-substituted acrylic acid is methacrylic acid.

9. The stain resistant composition of claim 1, wherein mixtures of hydroxyaromatic compounds are reacted with the aldehyde.

10. The stain resistant composition of claim 1, wherein an aromatic compound without hydroxyl groups is included in the aldehyde condensation reaction.

11. The stain resistant composition of claim 1, wherein the hydroxyaromatic is reacted with a saturated carboxylic acid.

12. The stain resistant composition of claim 1, wherein the hydroxyaromatic is reacted with an unsaturated carboxylic acid.

13. The stain resistant composition of claim 1, wherein mixtures of α-substituted acrylic acids are used in step (iii).

14. The stain resistant composition of claim 1, wherein acrylic acid is used in combination with an α-substituted acrylic acids in step (iii).

* * * * *